(12) United States Patent
Watanabe et al.

(10) Patent No.: US 8,725,686 B2
(45) Date of Patent: May 13, 2014

(54) METHOD AND PROGRAM FOR CREATING DETERMINATE BACKUP DATA IN A DATABASE BACKUP SYSTEM

(75) Inventors: Satoru Watanabe, Kokubunji (JP); Shinji Fujiwara, Sagamihara (JP); Yoshio Suzuki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 776 days.

(21) Appl. No.: 11/012,102

(22) Filed: Dec. 16, 2004

(65) Prior Publication Data

US 2006/0085672 A1     Apr. 20, 2006

(30) Foreign Application Priority Data

Sep. 30, 2004    (JP) .................................. 2004-286220

(51) Int. Cl.
*G06F 7/00* (2006.01)
*G06F 17/00* (2006.01)

(52) U.S. Cl.
USPC .......................................... 707/624; 707/640

(58) Field of Classification Search
USPC ........................... 707/624, 610, 640, 646, 655
See application file for complete search history.

(56) References Cited

U.S. PATENT DOCUMENTS 5,530,855 A * 6/1996 Satoh et al. .................... 707/648
5,592,660 A   1/1997 Yokota et al.
6,035,412 A * 3/2000 Tamer et al. ................... 714/6.3
6,038,569 A * 3/2000 Beavin et al. ................. 707/203
6,754,792 B2  6/2004 Nakamura et al.
7,003,694 B1 * 2/2006 Anderson et al. ............... 714/16

FOREIGN PATENT DOCUMENTS

| JP | 4-124743 | 4/1992 |
|---|---|---|
| JP | 5-307576 | 11/1993 |
| JP | 2002-148069 | 5/2002 |
| JP | 2002-189570 | 7/2002 |
| JP | 2004-240566 | 8/2002 |
| JP | 2004-094710 | 3/2004 |

OTHER PUBLICATIONS

"Evaluation of Remote Backup Algorithms for Transaction-Processing Systems", ACM Transactions on Database Systems, vol. 19, No. 3, Sep. 1994, pp. 423-449.

* cited by examiner

*Primary Examiner* — Usmaan Saeed
*Assistant Examiner* — Paul Kim
(74) *Attorney, Agent, or Firm* — Antonelli, Terry, Stout & Kraus, LLP.

(57) ABSTRACT

The invention provides an application technique of a backup data in which a backup data can be utilized by creating a backup data including no indeterminate data in a backup system. In a backup system including a primary system and a backup system, the method of creating the backup data includes: a data update record rerun step for rerunning a data update record to a backup data; and a backup data creation step for starting a read to a backup data B, stopping a read to a backup data A, copying the backup data to the backup data A, starting the read to the backup data A, stopping the read to the backup data B, and copying the backup data A to the backup data B.

3 Claims, 16 Drawing Sheets

| INFORMATION OF STORAGE LOCATION | DATA |
|---|---|
| 0 | AAAAAAA |
| 1 | BBBBBBB |
| 2 | CCCCCCC |
| 3 | DDDDDDD |
| 4 | EEEEEEE |

| NUMBER OF UPDATE RECORD | LOG |
|---|---|
| 0 | TRANSACTION START(TRANSACTION NUMBER 1) |
| 1 | TRANSACTION START(TRANSACTION NUMBER 2) |
| 2 | TRANSACTION NUMBER 1 : UPDATE DATA "AAAAAAA" AT STORAGE LOCATION 0 TO DATA "BBB" |
| 3 | TRANSACTION NUMBER 2 : UPDATE DATA "BBBBBBB" AT STORAGE LOCATION 1 TO DATA "CCC" |
| ⋮ | ⋮ |
| 10 | TRANSACTION COMMIT(TRANSACTION NUMBER 1) |
| 11 | TRANSACTION COMMIT(TRANSACTION NUMBER 2) |
| ⋮ | ⋮ |

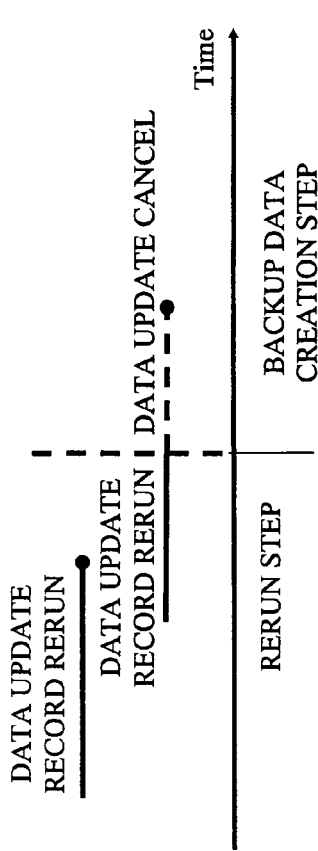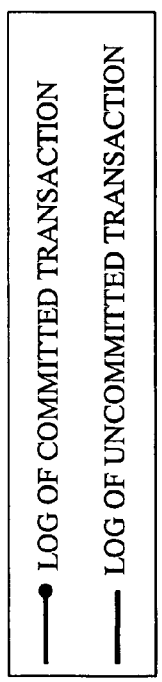
FIG. 6A
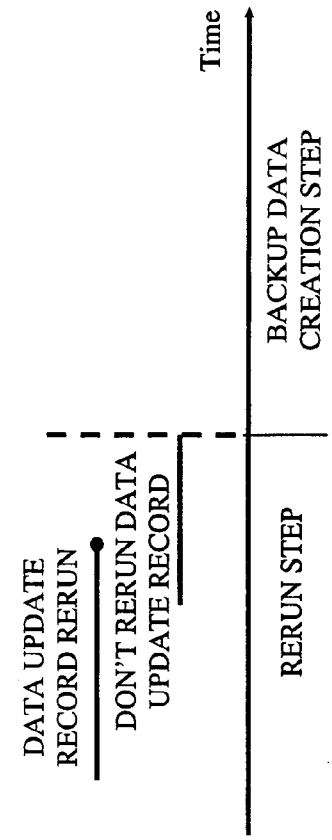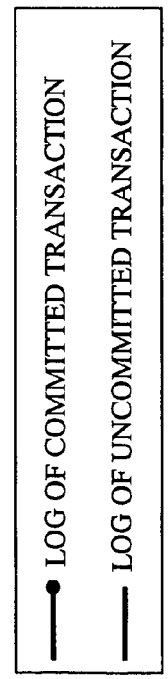
FIG. 6B

US 8,725,686 B2

METHOD AND PROGRAM FOR CREATING DETERMINATE BACKUP DATA IN A DATABASE BACKUP SYSTEM

CROSS-REFERENCE TO RELATED APPLICATION

The present application claims priority from Japanese Patent Application No. JP 2004-286220 filed on Sep. 30, 2004, the content of which is hereby incorporated by reference into this application.

TECHNICAL FIELD OF THE INVENTION

The present invention relates to an application technique of a backup data. More particularly, it relates to a technique effective when applied to a method of creating a backup data which does not include any indeterminate data in a backup system which is a computer system used as a backup destination in a system composed of two computer systems.

BACKGROUND OF THE INVENTION

According to a study made by the inventors of the present invention, the following techniques are known as the conventional application technique of the backup data.

For example, a backup system of a database using two computer systems has been widely used. The backup of the database means creating the same data as that of one computer system and storing the created date in the other computer system. The computer system used as a backup source is called as a primary system, and the computer system used as a backup destination is called as a backup system. Further, the data stored in the backup system is called as a backup data. The backup of the database by a duplex system is described in the document, for example, CHRISTOS A. POLYZOIS, HECTOR GARCIA-MOLINA, "Evaluation of Remote Backup Algorithms for Transaction-Processing Systems", ACM Transactions on Database Systems, Vol. 19, No. 3, September 1994, Pages 423-449.

As a backup method of the database by the duplex system, a log transfer method is known. The log transfer method is a method of transferring a data update record of the primary system to the backup system and creating the backup date in the backup system. In the log transfer method, the data in the primary system is made identical to the backup data in the backup system at a stage of starting the backup. After starting the backup, the data update record of the primary system is transferred to the backup system. In the backup system, the backup data is updated on the basis of the transferred data update record to create the latest backup data. The log transfer method is described in the above-identified document.

In general, the computer system includes an external storage device, and the data of the computer system is stored in the external storage device. The external storage device is a device for storing the date of the computer system, and is exemplified by magnetic storage devices such as a hard disk and a disk array.

Some external storage devices have a copy function to copy the data between two devices. For example, the copy function is described in Japanese Patent Application Laid-Open No. 2004-78746. In this copy function, the data is transferred via a network so that the data in one external storage device is copied to the other external storage device. In the case of using this copy function, when the data is added to the external storage device used as a copy source, the same data is added also to the external storage device used as a copy destination.

The backup in accordance with the log transfer method is executed by using the copy function of the external storage device. A mechanism thereof is as follows. At a time of starting the backup, the data in the primary system is made identical to the backup data in the backup system. The data update record added to the external storage device of the primary system is copied to the external storage device in the backup system by using the copy function for the data update record. In the backup system, the latest backup data is created on the basis of the copied data update record.

Further, the technique of duplexing the backup data in the backup system has been prevailing. In the case of duplexing the backup data, two areas for storing the backup data are prepared in the external storage device of the backup system. The backup data is created in one storage area in accordance with the log transfer method, and the backup data is copied to the other storage region.

A method of copying the storage area of the external storage device is described in, for example, Japanese Patent Application Laid-Open No. 2003-345523. This copy function is a function to copy the data in two designated storage areas, and it is possible to duplex the backup data by using this function.

In this case, as a result of the study the inventors of the present invention for the conventional application technique of the backup data as mentioned above, the following matters have been found out.

For example, there has been conventionally a problem that the backup data of the backup system includes an unavailable data. This is caused by the fact that the data in which an uncommitted transaction is active is present in the backup data of the backup system. The transaction means a series of data operation, and the data operation becomes effective at the time when the transaction is committed. The data in which the uncommitted transaction is active is an indeterminate data, and the indeterminate data cannot be utilized.

For example, the case where the data of the primary system is updated by a certain transaction will be described. When the transaction updates the data of the primary system, the data update record is transferred to the backup system, and the data in the backup system is also updated. However, the data operation is not effective until the transaction is committed. For example, there is a case where a rollback is executed before the transaction is committed, and the data is returned. Accordingly, the backup data includes the unavailable indeterminate data from the time when the data is updated to the time when the transaction is committed.

SUMMARY OF THE INVENTION

Accordingly, an object of the present invention is to provide an application technique of a backup data in which a backup data can be utilized by creating a backup data including no indeterminate data in a backup system.

The above and other objects and the novel features of the present invention will become apparent from the description in the specification and the accompanying drawings.

The representative ones of the inventions disclosed in this specification will be briefly described as follows.

(1) A first aspect of a method and program for creating a backup data according to the present invention is applied to a technique for creating a backup data by using a first backup data and a second backup data in a backup system which receives a data update record of a database to back up the database, which comprises:

a data update record rerun step for rerunning a data update to the first backup data; and a backup data creation step for stopping a read to the second backup data, copying the first backup data to the second backup data and starting the read to the second backup data.

Further, the backup data creation step includes a process of canceling the date update of a transaction which is being rerun. In addition, the data update rerun step reruns the data update of the committed transaction to the first backup data.

(2) A second aspect of a method and program for creating a backup data according to the present invention is applied to a technique for creating a backup data by using first, second and third backup data in a backup system which receives a data update record of a database to back up the database, which comprises:

a data update record rerun step for rerunning a data update to the first backup data; and a backup data creation step for starting a read to the third backup data, stopping a read to the second backup data, copying the first backup data to the second backup data, starting the read to the second backup data, stopping the read to the third backup data and copying the second backup data to the third backup data.

Further, the backup data creation step includes a process of canceling the date update of a transaction which is being rerun. In addition, the data update rerun step reruns the data update of the committed transaction to the first backup data.

Further, in the backup data creation step, the date of the second backup data which is different from the first backup data is stored in the third backup data, and the first backup date is copied to the second backup data, the second backup data is read during the execution of the data update record rerun step, and the second backup data and the third backup data are read during the execution of the backup data creation step.

Further, in the case of reading the second backup data and the third backup data during the execution of the backup data creation step, the data stored in the third backup data reads the third backup data, and the data not stored in the third backup data reads the second backup data.

(3) A third aspect of a method and program for creating a backup data according to the present invention is applied to a technique for creating a backup data in a backup system which receives a data update record of a database to back up the database, which comprises:

a data update record rerun step for rerunning a data update to the backup data;

a backup data read step for reading the backup data; and a determination step for determining whether the data update record rerun step or the data read step is executed.

Further, the data update rerun step includes: a step of stopping the read of the backup data; a data update cancel step for canceling the data update of the transaction which is being rerun; and a step of starting the read of the backup data. In addition, the data update rerun step reruns the data update of the committed transaction to the backup data.

Further, an importance of the data update record rerun step and an importance of the backup data read step can be set in the determination step, and the determination step determines the execution of the step having the higher importance. Further, the determination step changes the set importance on the basis of a received data amount of the data update record.

BRIEF DESCRIPTIONS OF THE DRAWINGS

FIG. 3 is a diagram for explaining stored contents of a data, a backup data, a backup data A and a backup data B according to the first embodiment of the present invention;

FIG. 4 is a diagram for explaining a stored content of a data update record according to the first embodiment of the present invention;

FIG. 6A is a diagram for respectively explaining a method of executing rollback according to the first embodiment of the present invention;

FIG. 6B is a diagram for respectively explaining a method of applying only a committed transaction to a log according to the first embodiment of the present invention;

DESCRIPTION OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

The present invention includes the first embodiment comprising a backup system for utilizing a backup data by the use of a first backup data (backup data for backup), a second backup data (backup data A) and a third backup data (backup data B), the second embodiment comprising a backup system for utilizing a backup data by the use of a first backup data and a second backup data (backup data A), and the third embodiment comprising a backup system for utilizing a backup data. Further, each of the embodiments has a method (a method of executing rollback) in which a backup data creation step includes a process of canceling a data update of a transaction which is being rerun, and a method (a method of applying only a committed transaction to a log) in which a data update record rerun step reruns a data update of a committed transaction to the backup data. Each of them will be described in detail below.

First Embodiment

Figure 1:
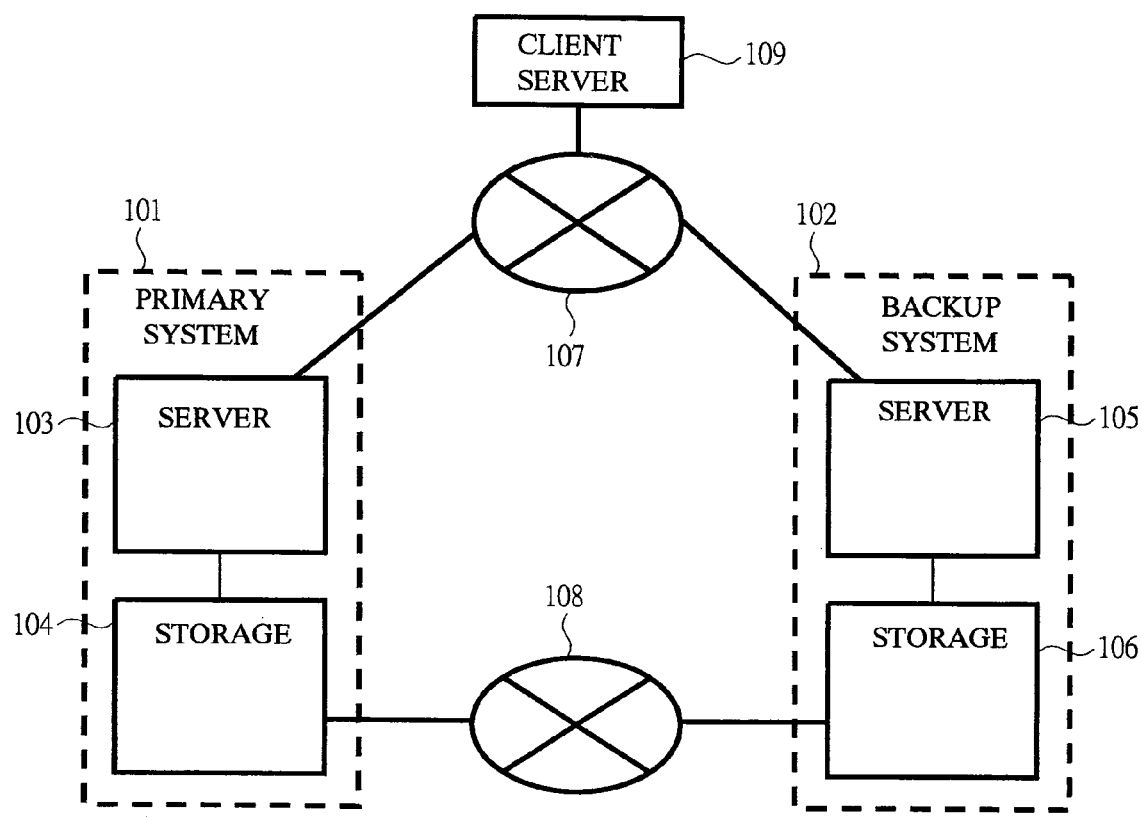
FIG. 1 is a block diagram showing the configuration of a data backup system by a duplex system according to each of the embodiments of the present invention.

FIG. 1 is a block diagram showing the configuration of a data backup system by a duplex system according to an embodiment of the present invention. Note that the system configuration is common in all of the first to third embodiments which will be described sequentially below within a range shown in FIG. 1.

The data backup system by the duplex system includes two computer systems. A computer system used as a backup source is called as a primary system 101, and a computer system used as a backup destination is called as a backup system 102. The primary system 101 includes a server 103 of the primary system and a storage 104 of the primary system. The backup system 102 includes a server 105 of the backup system and a storage 106 of the backup system. The server 103 of the primary system 101 and the server 105 of the backup system 102 are connected by a network 107 such as the Internet or the like. A client computer 109 is connected to the network 107. The storage 104 of the primary system 101 and the storage 106 of the backup system 102 are connected by a network 108 such as the SAN or the like.

Figure 2:
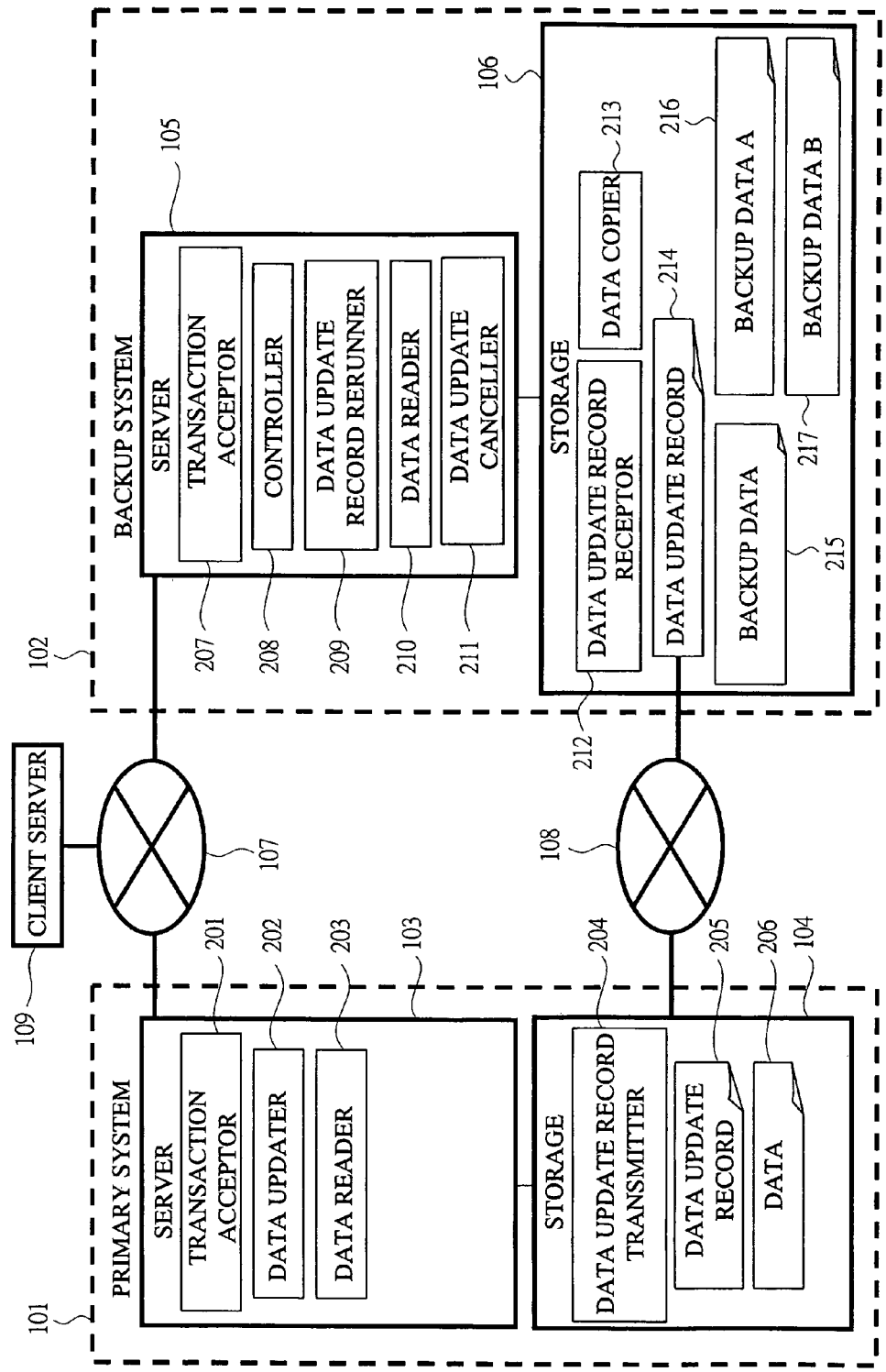
FIG. 2 is a functional block diagram showing a function of each component in the data backup system by the duplex system according to a first embodiment of the present invention.

FIG. 2 is a functional block diagram showing a function of each component in the data backup system by the duplex system according to the first embodiment.

The server 103 of the primary system 101 has a transaction acceptor 201, a data updater 202 and a data reader 203. The storage 104 of the primary system 101 has a data update record transmitter 204, and stores a data update record 205 and a data 206. The server 105 of the backup system 102 has a transaction acceptor 207, a controller 208, a data update record rerunner 209, a data reader 210 and a data update canceller 211. The storage 106 of the backup system 102 has a data update record receptor 212 and a data copier 213, and stores a data update record 214, a backup data 215, a backup data A 216 and a backup data B 217.

FIG. 3 is a diagram for explaining stored contents of the data, the backup data, the backup data A and the backup data B.

Each of the data 206, the backup data 215, the backup data A 216, and the backup data B 217 includes information of identifying a storage location and data.

FIG. 4 is a diagram for explaining a stored content of the data update record.

The data update records 205 and 214 include a number of data update record and a log. The log includes three kinds such as a transaction start log, a data update log and a transaction commit log. The transaction start log includes a transaction number and information indicating a start of the transaction. The data update log includes a transaction number, information of identifying the storage location of the updated data, data before update and data after update. The transaction commit log includes a transaction number and information indicating the commit of the transaction.

In the configuration of the data backup system by the duplex system mentioned above, the client computer 109 can request an execution of the transaction to the transaction acceptor 201 of the primary system 101. The transaction acceptor 201 of the primary system 101 to which the execution of the transaction is requested executes a series of data operation of the transaction by using the data updater 202 and the data reader 203, and returns the result of the data operation to the client computer 109. Further, the client computer 109 can request an execution of the transaction to the transaction acceptor 207 of the backup system 102. The transaction acceptor 207 of the backup system 102 to which the execution of the transaction is requested executes a series of data operation of the transaction by using the data reader 210, and returns a result of the data operation to the client computer 109.

As mentioned above, in the data backup system by the duplex system according to this embodiment, the request of the execution of the transaction can be issued from the client computer 109 to both of the primary system 101 and the backup system 102. It is possible to effectively make good use of a computer resource by executing the transaction by both the systems.

Next, an operation at the time when the transaction acceptor 201 of the primary system 101 receives the request of executing the transaction will be described.

When the transaction acceptor 201 of the primary system 101 receives the request of executing the transaction, the transaction acceptor 201 adds the transaction start log to the date update record 205. The transaction acceptor 201 executes the operation of the data by using the data updater 202 and the data reader 203 in accordance with the data operation of the transaction accepted from the client computer 109.

When accepting the request of the data update from the transaction acceptor 201, the data updater 202 updates the data, adds the data update log to the data update record 205, and notifies the transaction acceptor 201 of a completion of the data update. When accepting the request of the data read from the transaction acceptor 201, the date reader 203 reads the data, and returns the read data to the transaction acceptor 201.

When the series of data operation of the transaction accepted from the client computer 109 is committed, the transaction acceptor 201 adds the transaction commit log to the data update record 205, and returns the execution result of the transaction to the client computer 109.

When the transaction acceptor 207 of the backup system 102 accepts the execution request of the transaction, the transaction acceptor 207 executes the operation of the data by using the data reader 210 in accordance with the data operation of the transaction accepted from the client computer 109. In the case where the accepted transaction includes the date update operation, an error is turned back to the client computer 109.

When accepting the request of data read from the transaction acceptor 207, the data reader 210 of the backup system 102 reads the backup data A 216, and returns the read data to the transaction acceptor 207. Note that the data reader 210 can read the backup data B 217, and in the case of accepting a command of changing the backup data to be read from the controller 208, the date reader 210 changes the backup data to be read.

When the series of data operation of the transaction accepted from the client computer 109 is committed, the transaction acceptor 207 of the backup system 102 returns the execution result of the transaction to the client computer 109.

Next, a mechanism of copying the data update record 205 of the primary system 101 to the data update record 214 of the backup system 102 will be described.

When a new log is added to the data update record 205, the data update record transmitter 204 of the primary system 101 transmits the log to the data update record receptor 212 of the backup system 102. The data update record receptor 212 of the backup system 102 adds the received log to the data update record 214.

Figure 5:
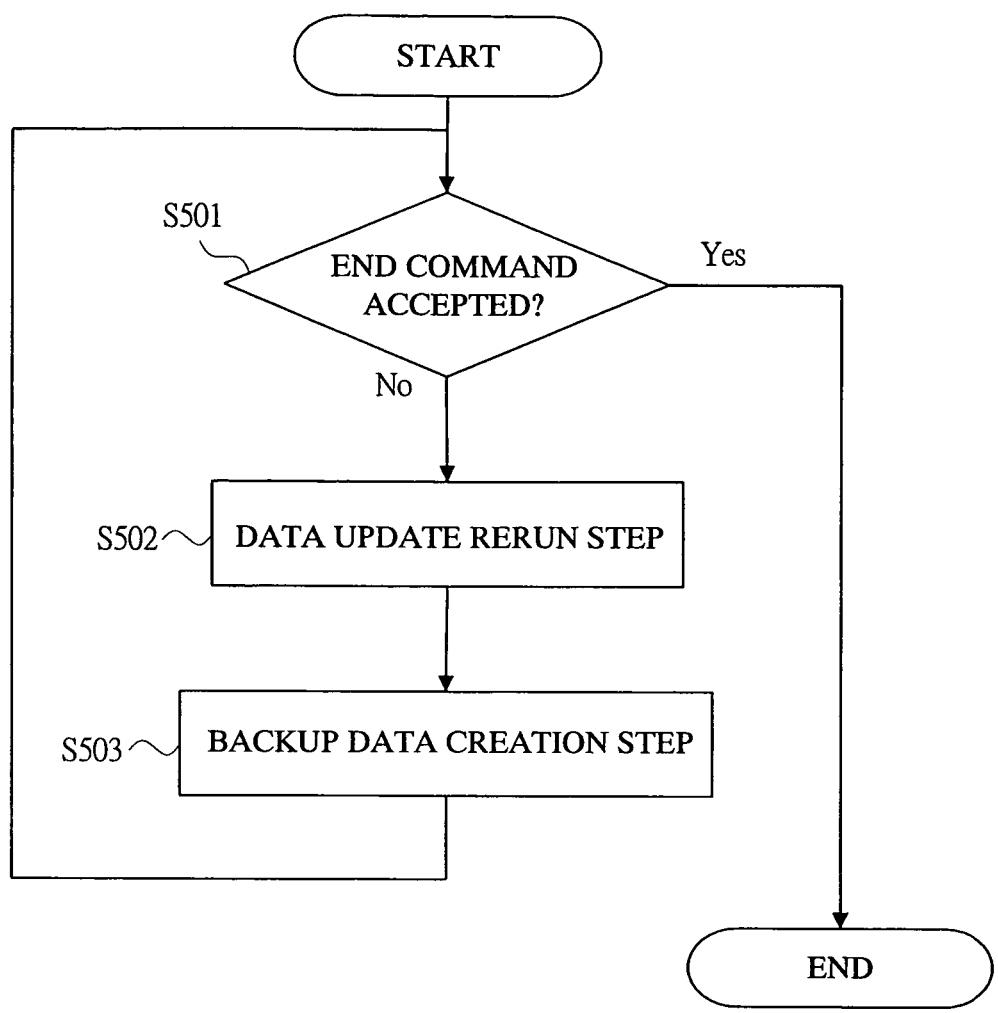
FIG. 5 is a flowchart showing an operation of a controller according to the first embodiment of the present invention.

Next, an operation of the controller according to this embodiment will be described. FIG. 5 is a flowchart showing an operation of the controller. FIGS. 6A and 6B are diagrams for explaining a method of executing rollback and a method of applying only the committed transaction to a log.

The controller 208 of the backup system 102 can accept an end command from the client computer 109, determines whether or not the end command is accepted from the client computer 109 (S501), stops the operation in the case of accepting the end command (Yes), executes the data update record rerun step (S502) in the case of accepting no end command (No), and executes the date creation step (S503).

The operation including the data update record rerun step and the date creation step is controlled by executing a control program created so as to be operated in accordance with a flowchart mentioned below.

In the execution of the data update record rerun step and the backup data creation step, the method of executing rollback as shown in FIG. 6A and the method of applying only the committed transaction to a log as shown in FIG. 6B are available. In the method of executing rollback shown in FIG. 6A, the transferred log is sequentially applied to the log, and the log application of the uncommitted transaction is cancelled at the time of change from the data update record rerun step to the backup data creation step. This log application is a process of reading the transferred data and updating the data. In the method of applying only the committed transaction to a log shown in FIG. 6B, only the committed transaction is reflected to the data.

Figure 7:
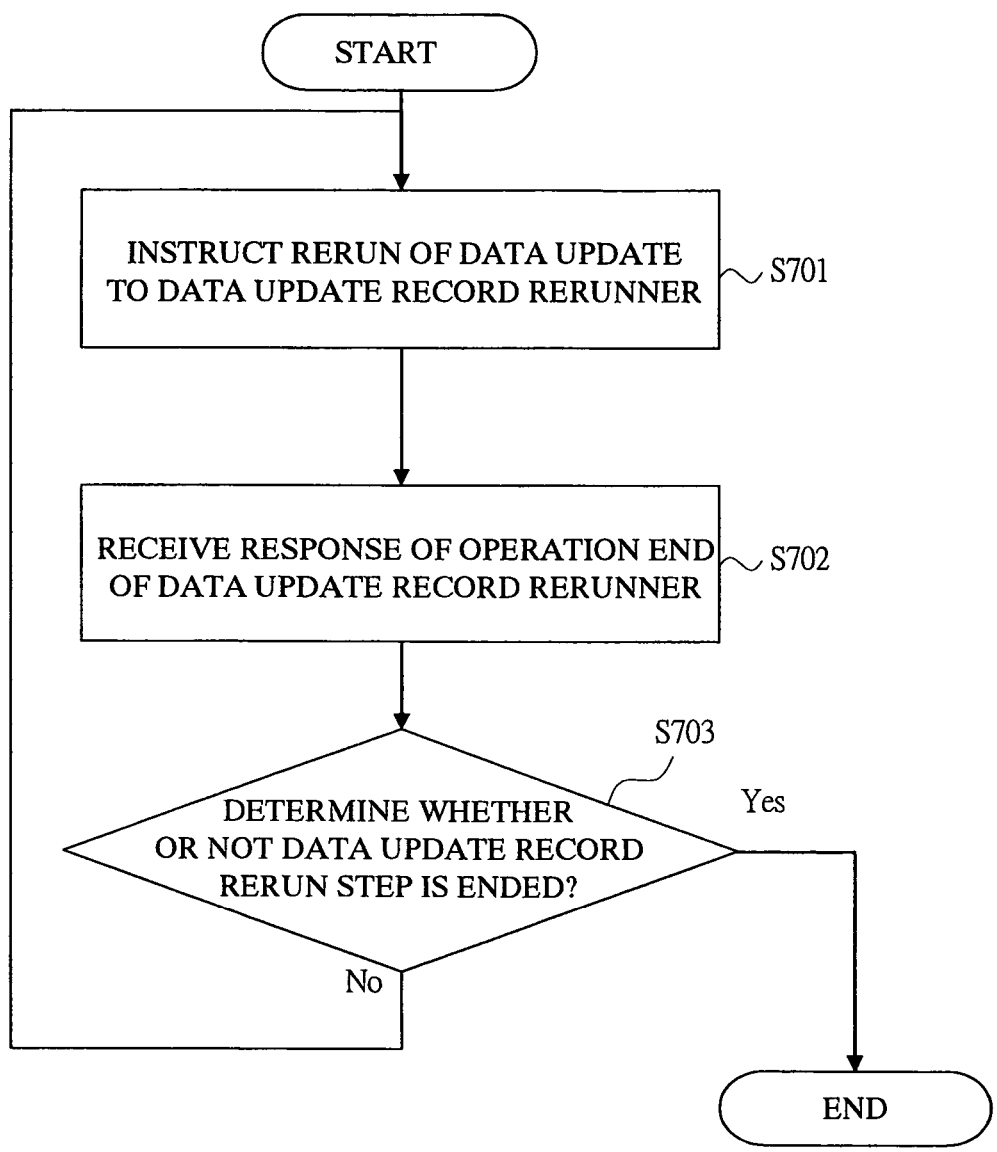
FIG. 7 is a flowchart showing an operation of a data update record rerun step according to the first embodiment of the present invention.

FIG. 7 is a flowchart showing an operation of the data update record rerun step.

When starting the data update record rerun step (S502), the data update record rerun is instructed to the data update record rerunner 209 (S701), and a response of the operation end of the data update record rerunner 209 is received (S702).

The controller 208 can receive the end command of the data update record rerun step from the client computer 109, and determines whether or not the end command of the data update record rerun step is received from the client computer 109 (S703). In the case of receiving the end command of the data update record rerun step (Yes), the data update record rerun step is ended, and in the case of not receiving the command (No), the process returns to the step S701.

When receiving the command of the data update record rerun from the controller 208, the data update record rerunner 209 starts to operate.

Figure 8:
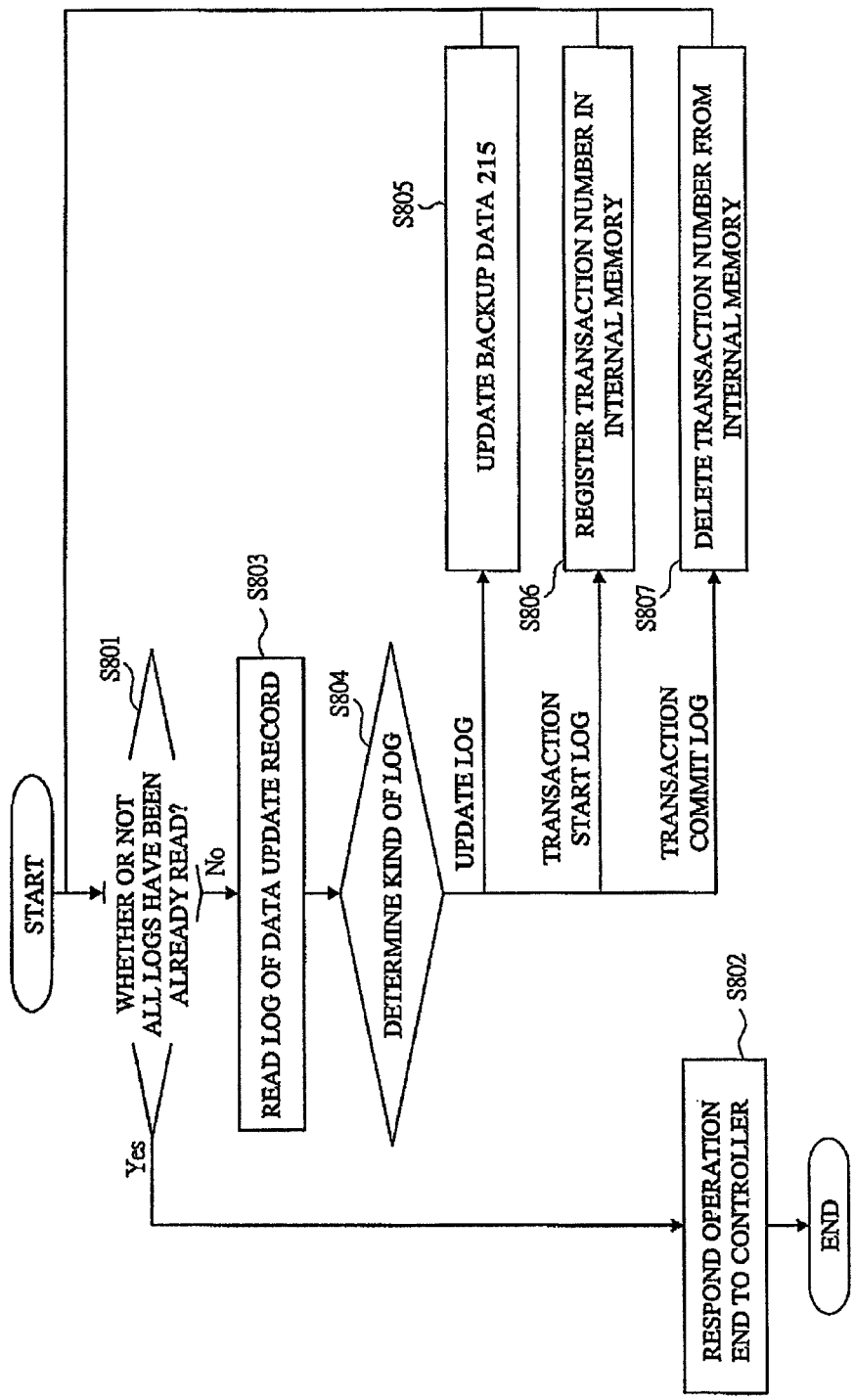
FIG. 8 is a flowchart (a method of executing rollback) showing an operation of a data update record rerunner according to the first embodiment of the present invention.

FIG. 8 is a flowchart shoring an operation of the data update record rerunner. This flowchart is applied to the method of executing the rollback.

The data update record rerunner 209 determines whether or not all the logs have been already read (S801), responds the operation end to the controller 208 (S802) and ends the process in the case where they have been already read (Yes), and reads the log of the data update record (S803) in the case where they have not been read yet (No). Then, after determining the kind of the read log(S804), the backup data 215 is updated (S805) in the case of the update log, the transaction number is registered in the internal memory (S806) in the case of the transaction start log, and the transaction number is deleted from the internal memory (S807) in the case of the transaction commit log. Then, the process returns to S801.

Figure 9:
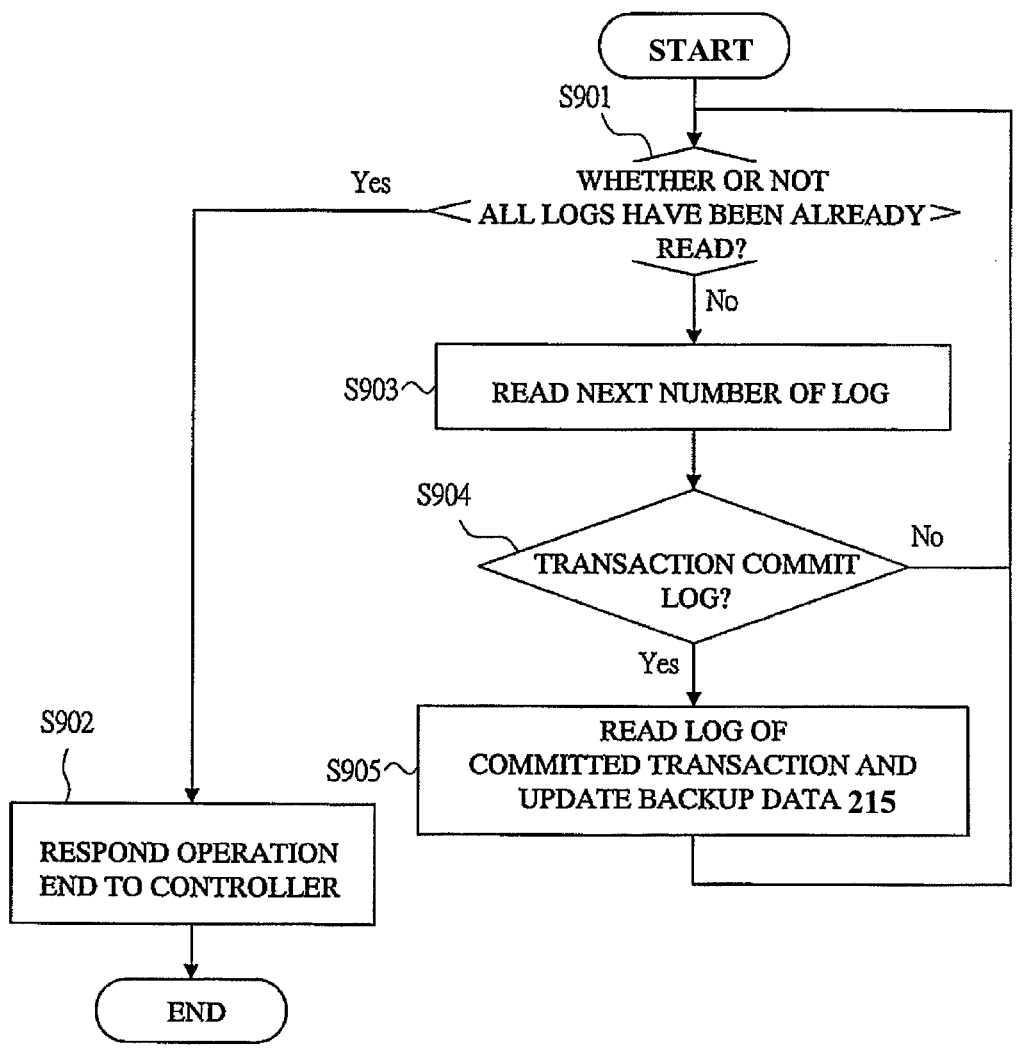
FIG. 9 is a flowchart (a method of applying only a committed transaction to a log) showing the motion of the data update record rerunner according to the first embodiment of the present invention.

FIG. 9 is a flowchart showing an operation of the data update record rerunner. The flowchart is applied to the method of applying only the committed transaction to a log.

The data update record rerunner 209 determines whether or not all the logs have been already read (S901), responds the operation end to the controller 208 (S902) and ends the process in the case where they have been already read (Yes), and reads the log of the next number (S903) in the case where they have not been read yet (No). Then, after determining whether or not the read log is the transaction commit log (S904), the log of the committed transaction is read, and the backup data 215 is updated (S905) in the case where it is the transaction commit log (Yes), and thereafter, the process returns to S901. Further, in the case where it is not the transaction commit log (No), the process immediately returns to S901.

Figure 10:
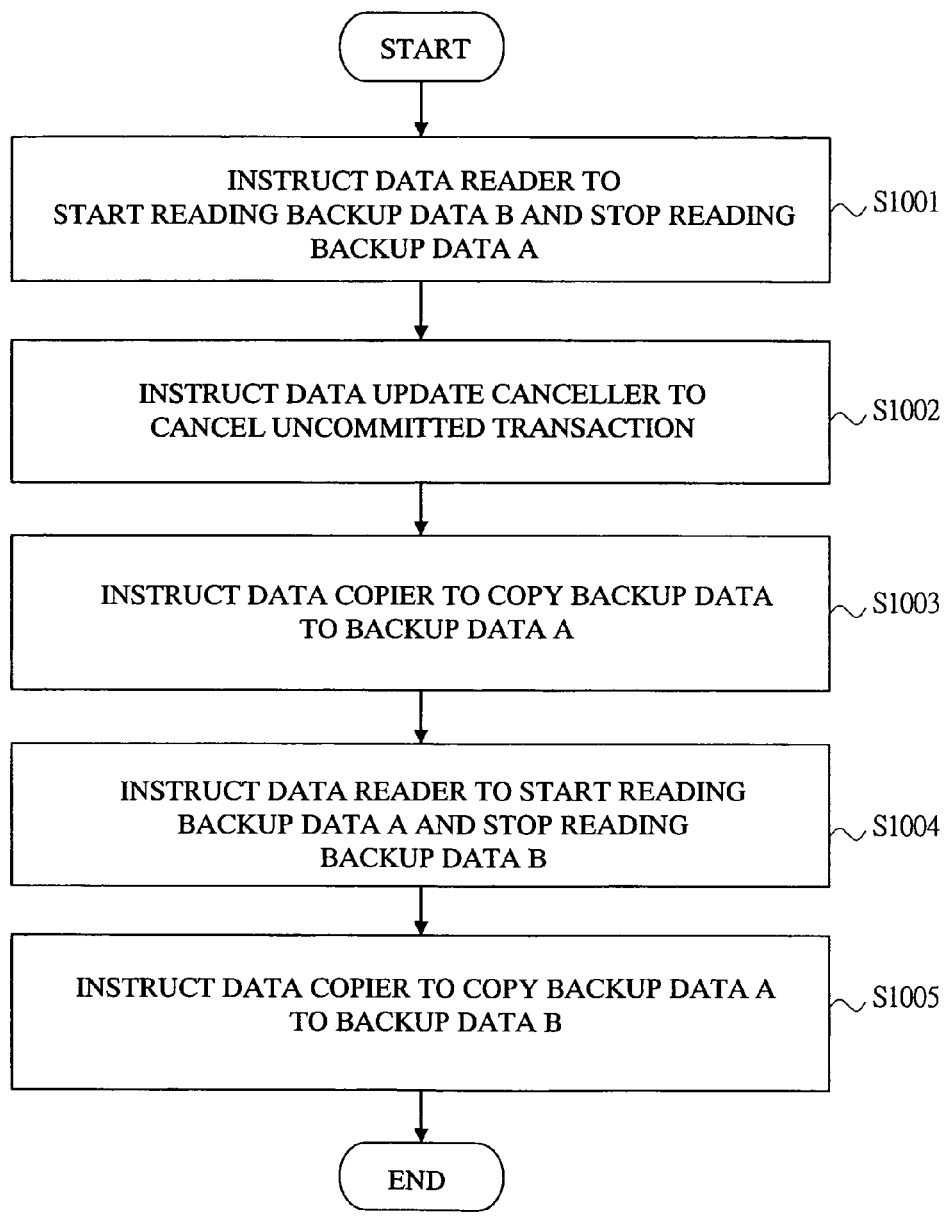
FIG. 10 is a flowchart (a method of executing rollback) showing an operation of a backup data creation step according to the first embodiment of the present invention.

FIG. 10 is a flowchart showing an operation of the backup data creation step. This flowchart is applied to the method of executing the rollback.

When starting the backup data creation step (S503), the data reader 210 is instructed to start reading the backup data B and stop reading the backup data A (S1001), further the data update canceller 211 is instructed to cancel the uncommitted transaction (S1002), and the data copier 213 is instructed to copy the backup data to the backup data A (S1003). Further, the data reader 210 is instructed to start reading the backup data A and stop reading the backup data B (S1004), and then, the data copier 213 is instructed to copy the backup data A to the backup data B (S1005).

Figure 11:
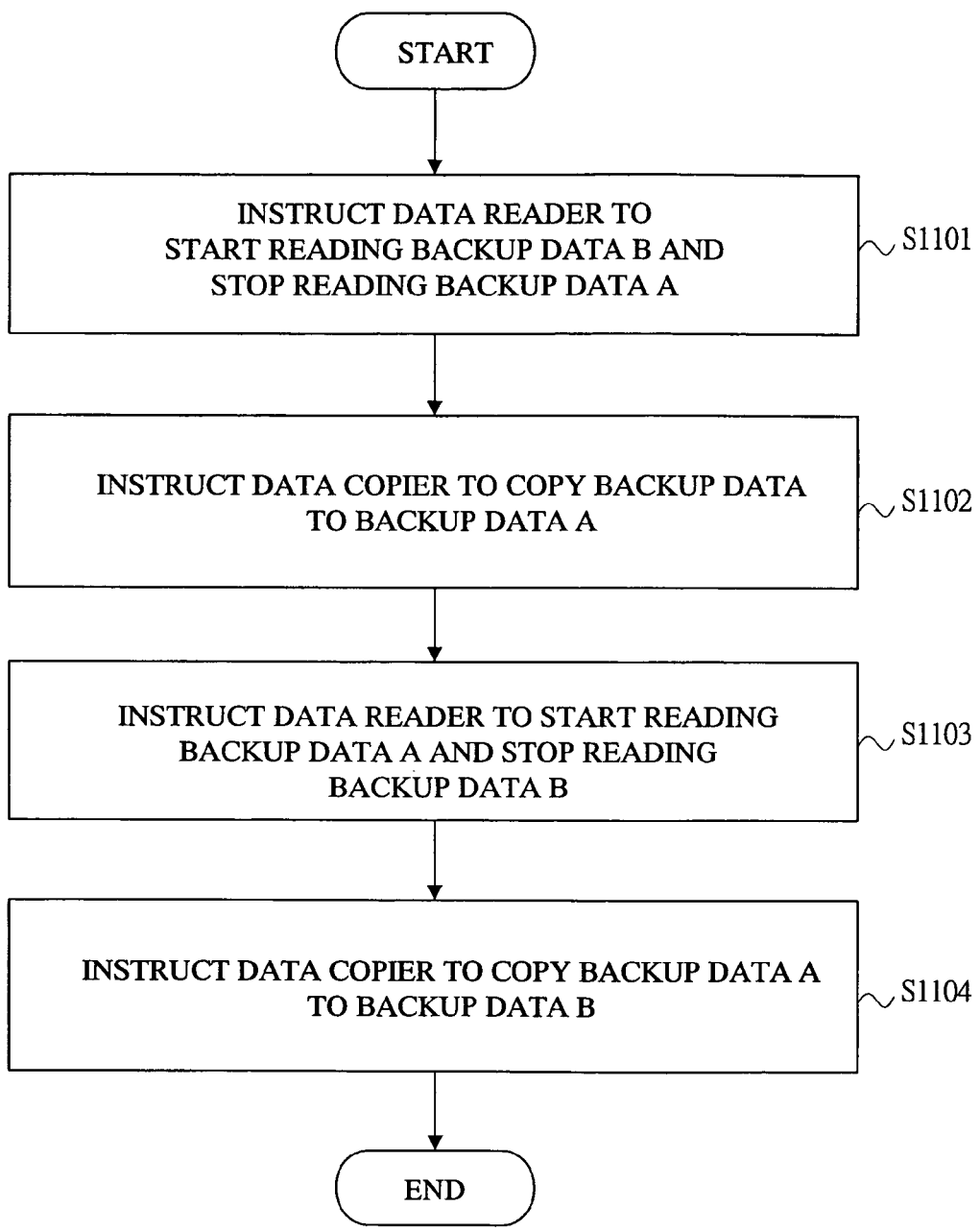
FIG. 11 is a flowchart (a method of applying only a committed transaction to a log) showing the operation of the backup data creation step according to the first embodiment of the present invention.

FIG. 11 is a flowchart showing an operation of the backup data creation step. This flowchart is applied to the method of applying only the committed transaction to a log.

When starting the backup data creation step (S503), the data reader 210 is instructed to start reading the backup data B and stop reading the backup data A (S1101), and the data copier 213 is instructed to copy the backup data to the backup data A (S1102). Further, the data reader 210 is instructed to start reading the backup data A and stop reading the backup data B (S1103), and then, the data copier 213 is instructed to copy the backup data A to the backup data B (S1104).

In particular, in the backup data creation step, the data of the backup data A which is different from the backup date is stored in the backup data B, a process of copying the backup data to the backup data A is executed, the backup data A is read during the execution of the data update record rerun step, and the backup data A and the backup data B are read during the execution of the backup data creation step. Further, in the case where the backup data A and the backup data B are read during the execution of the backup data creation step, the data stored in the backup data B reads the backup data B, and the data which is not stored in the backup data B reads the backup data A.

Figure 12:
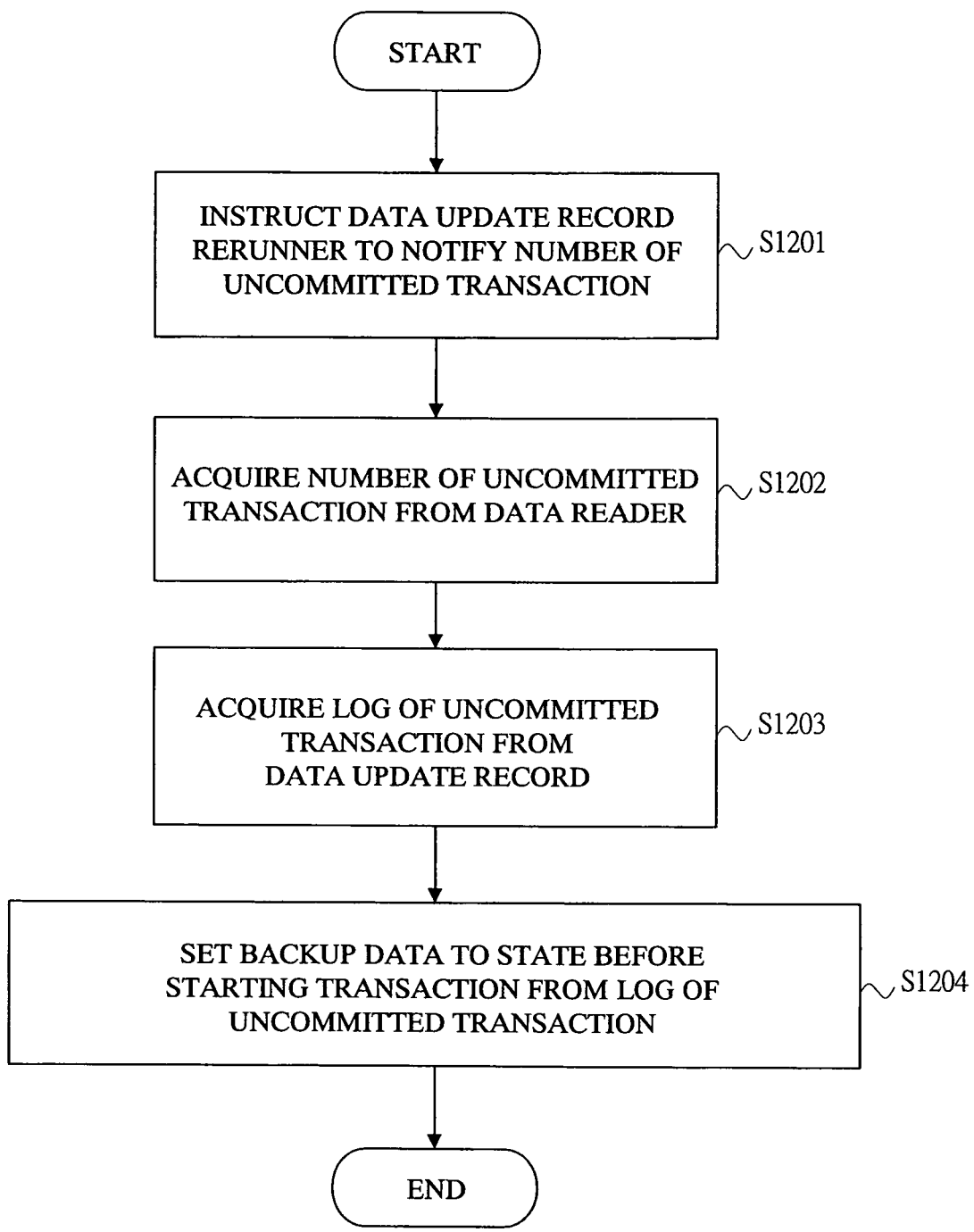
FIG. 12 is a flowchart showing an operation of a data update canceller according to the first embodiment of the present invention.

FIG. 12 is a flowchart showing an operation of the data update canceller.

The data update canceller 211 instructs to the data update record rerunner 209 to notify the number of the uncommitted transaction (S1201), and acquires the number of the uncommitted transaction from the data updater 202 (S1202). Further, it acquires the log of the uncommitted transaction from the data update record 205 (S1203), and sets the backup data to the state before starting the transaction from the log of the uncommitted transaction (S1204).

According to the first embodiment mentioned above, the data in which the uncommitted transaction is active is not present in the backup data A and the backup data B, and there is no unavailable date. Accordingly, the backup data can be available.

Second Embodiment

Further, the present invention includes the case where the backup data B is not used. In the case where the backup data B is not used, the flowchart of the backup data creation step in FIG. 10 (FIG. 11) described in the first embodiment is changed.

Figure 13:
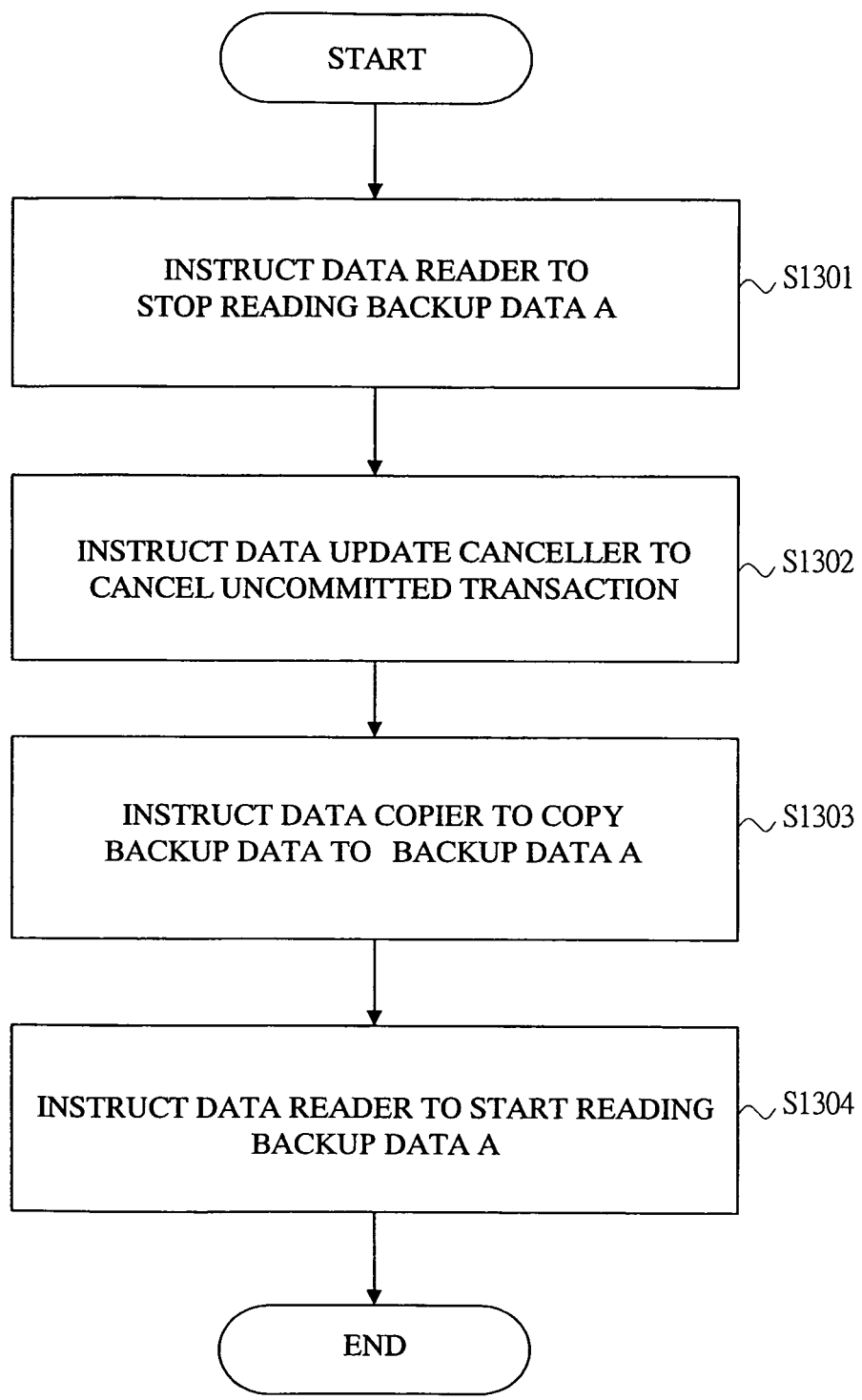
FIG. 13 is a flowchart showing an operation of a backup data creation step according to a second embodiment of the present invention.

The operation of the backup data creation step in the case where the backup data B is not used according to a second embodiment will be described. FIG. 13 is a flowchart showing an operation of the backup data creation step.

When starting the backup data creation step (S503), the data reader 210 is instructed to stop reading the backup data A (S1301), further the data update canceller 211 is instructed to cancel the uncommitted transaction (S1302), and the data copier 213 is instructed to copy the backup data to the backup data A (S1303). Then, the data reader 210 is instructed to start reading the backup data A (S1304).

By changing the operation of the backup data creation step to that shown in the flowchart in FIG. 13, the data in which the uncommitted transaction is active is not present in the backup data A during the reading of the data reader 210. Accordingly, the unavailable date does not exist in the backup data A, and the backup data can be available.

Third Embodiment

Figure 14:
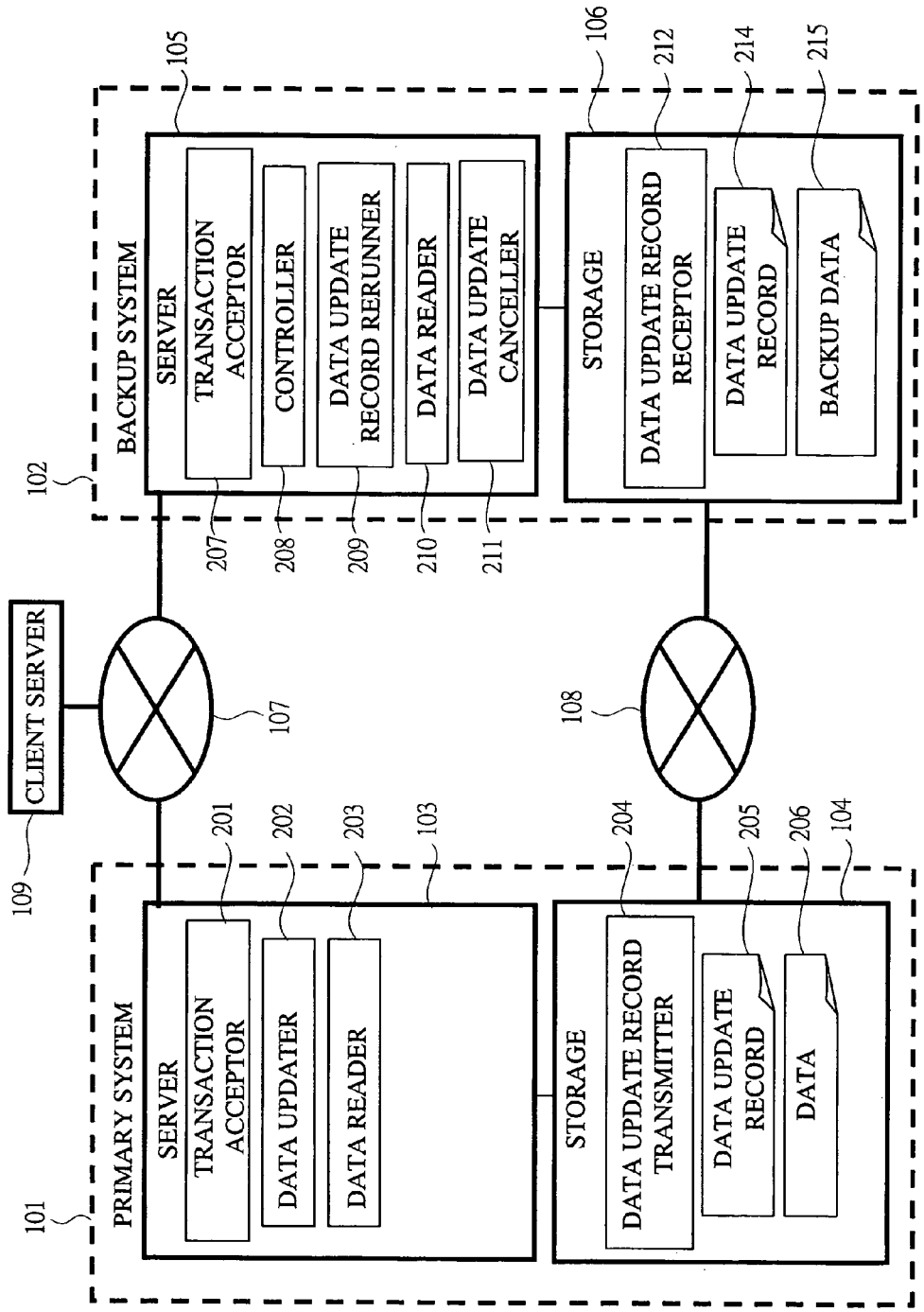
FIG. 14 is a functional block diagram showing a function of each component in a data backup system by a duplex system according to a third embodiment of the present invention.

Further, the present invention includes the case where the backup date is not used. FIG. 14 is a functional block diagram showing the function of each component in the data backup system by the duplex system according to a third embodiment.

In this embodiment, operations of the data reader and the controller are different from those described in the first and second embodiments. The third embodiment will be described in detail below.

When accepting the request of reading the data from the transaction acceptor 207, the data reader 210 reads the backup data 215, and returns the read data to the transaction acceptor 207. The data reader 210 reads the backup data 215 only in the case of receiving the instruction from the controller 208, and in the other cases, the data reader 210 returns an error to the transaction acceptor 207.

Figure 15:
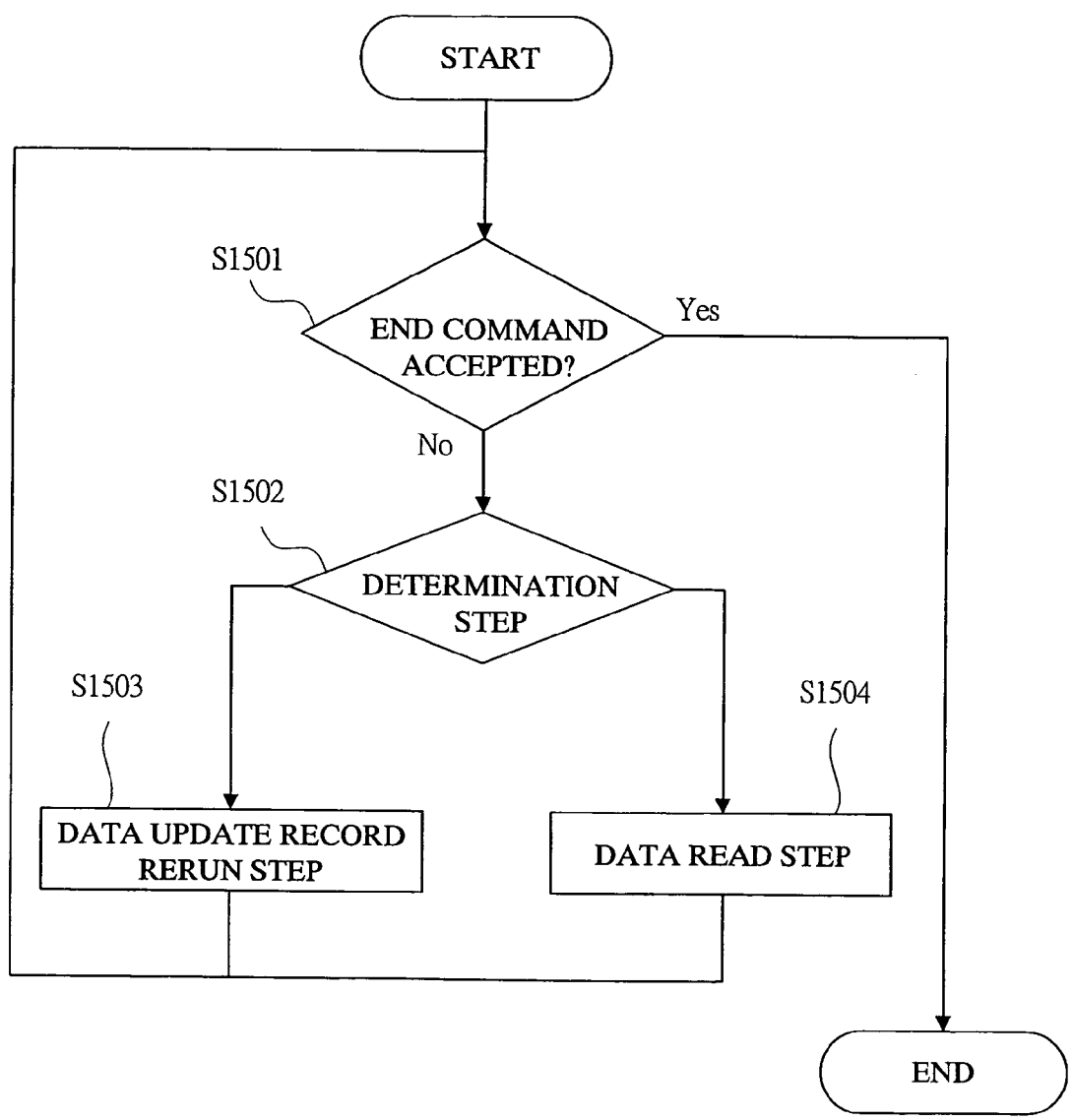
FIG. 15 is a flowchart showing an operation of a controller according to the third embodiment of the present invention.

FIG. 15 is a flowchart showing an operation of the controller.

The controller 208 can set the importance of the date update record rerun step and the importance of the data read step. In a determination step, the importance of the data update record rerun step and the importance of the date read step are changed on the basis of the received date amount and the like, and it is determined that the step having the higher importance is executed.

More specifically, the controller 208 of the backup system 102 determines whether or not the and command is received from the client computer 109 (S1501), stops the operation in the case where the end command is received (Yes), and executes the determination step (S1502) in the case where the end command is not received (No). Then, the controller 208 executes a data update record rerun step (S1503) or a data read step (S1504), which has the higher importance.

Figure 16:
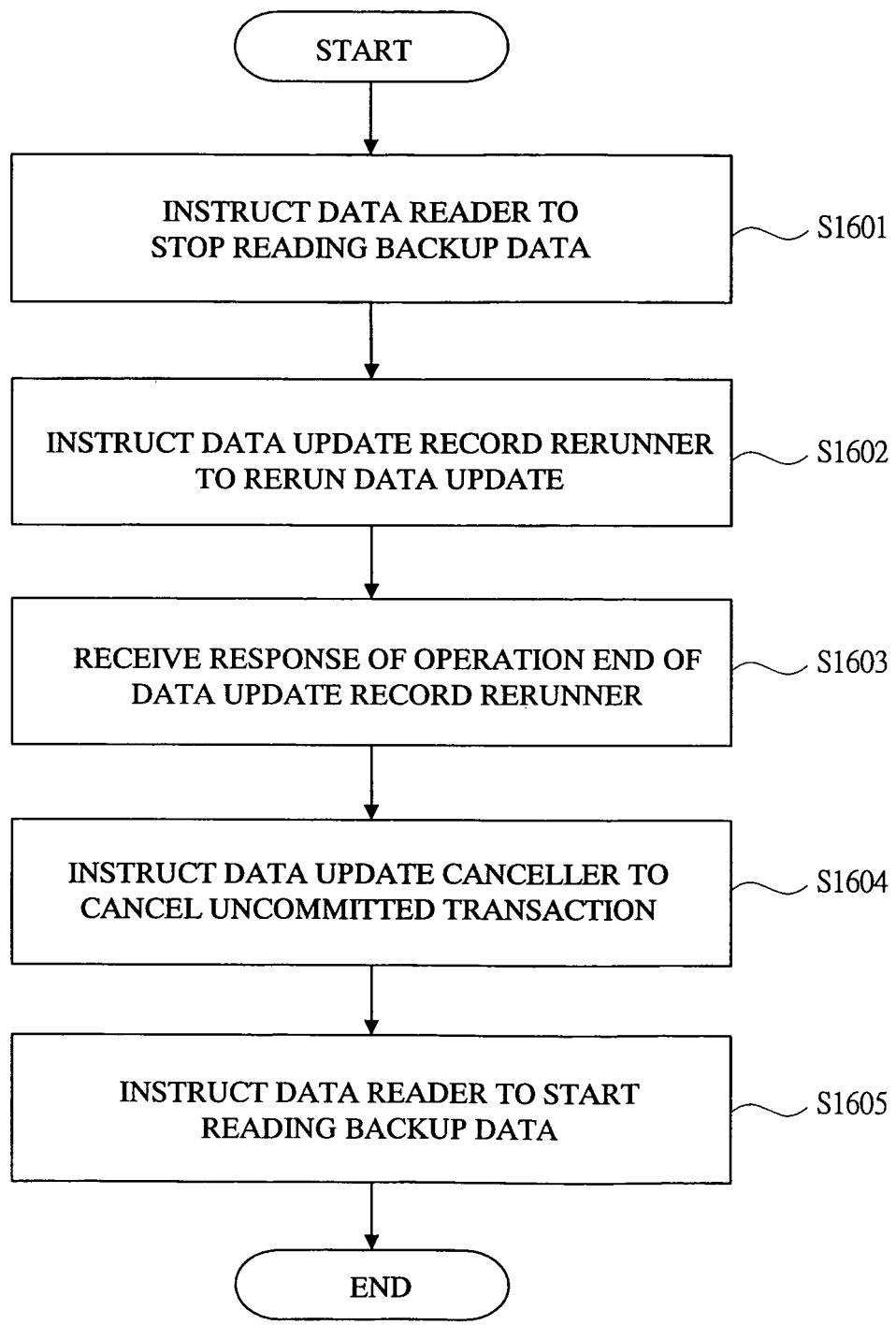
FIG. 16 is a flowchart showing an operation of a data update record rerun step according to the third embodiment of the present invention.

FIG. 16 is a flowchart showing an operation of the data update record rerun step.

When starting the data update record rerun step (S1503), the data reader 210 is instructed to stop reading the backup date (S1601), further the data update record rerunner 209 is instructed to rerun the data update (S1602), and a response of the operation end of the data update record rerunner 209 is received (S1603). Further, the data update canceller 211 is instructed to cancel the uncommitted transaction (S1604), and the data reader 210 is instructed to start reading the backup date (S1605).

Figure 17:
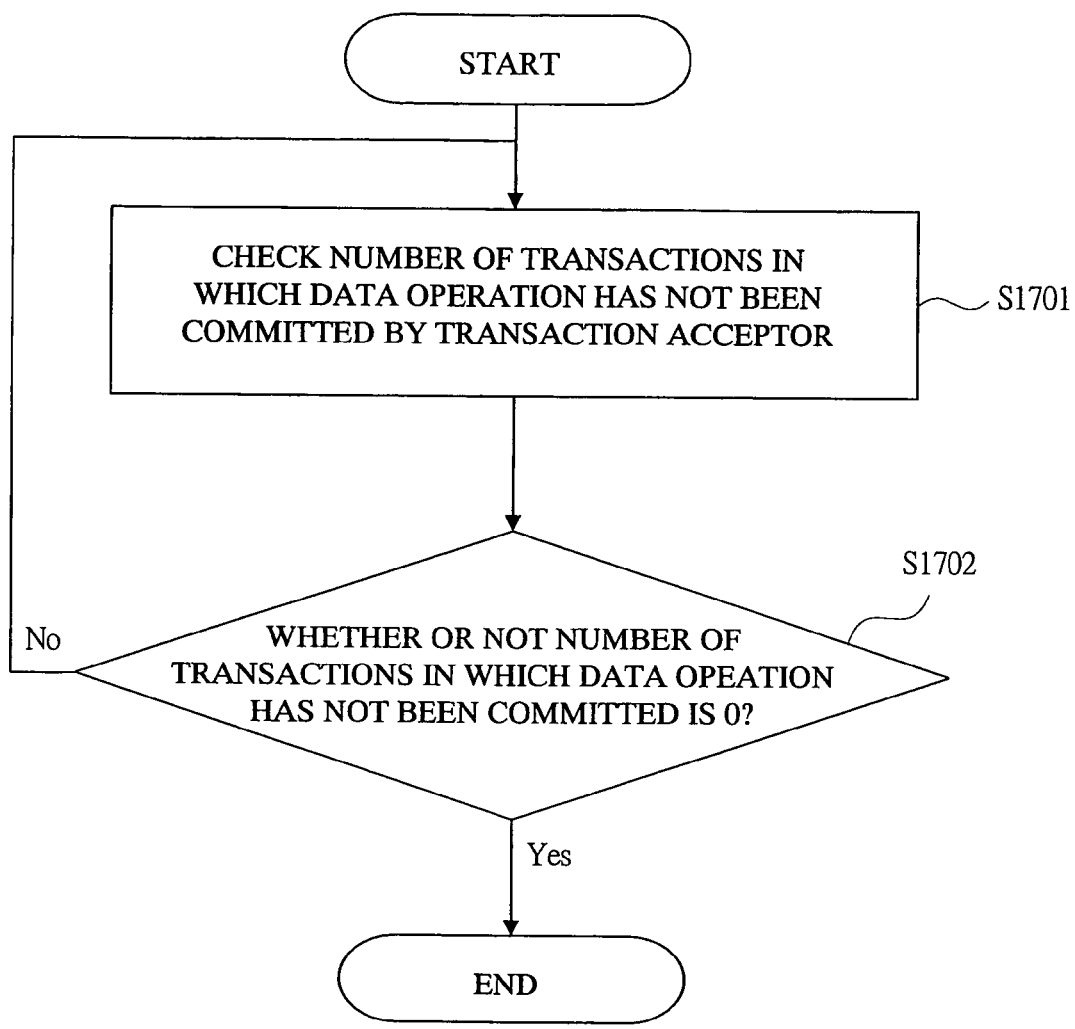
FIG. 17 is a flowchart showing an operation of a backup data read step according to the third embodiment of the present invention.

FIG. 17 is a flowchart showing an operation of the data read step.

In the date read step (S1504), the number of transactions in which the data operation is not finished is checked from the transaction acceptor 207 (S1701). Then, it is determined whether or not the number of transactions in which the data operation is not finished is 0 (S1702). The data read step is ended in the case where it is 0 (Yes), and the process returns to S1701 so as to continue the data read step in the case where the number of transactions is not 0 (No).

According to the third embodiment mentioned above in which the backup data is not used, the data in which the uncommitted transaction is active is not present in the backup data at the time when the data reader 210 reads the backup data. Accordingly, the unavailable data does not exist in the backup data, and the backup data is available.

In the foregoing, the invention made by the inventors of the present invention has been concretely described based on the embodiments. However, it is needless to say that the present invention is not limited to the foregoing embodiments and various modifications and alterations can be made within the scope of the present invention.

The effects obtained by the representative ones of the inventions disclosed in this specification will be briefly described as follows.

According to the present invention, the backup data can be utilized by creating the backup data which does not include any indeterminate data in the backup system.

What is claimed is:

1. A method carried out in a computer, for preparing, in a backup system, a referable backup data of data of a database which is maintained in a primary system, by using data update records of said database which are successively sent from said primary system, the method comprising:

collectively rerunning, on a first backup data set provided additionally beyond the database maintained in the primary system, every data update indicated in each of update records, which are respectively followed by individual records indicating transaction commit for said data, where the update records were sent from said primary system to effect backup of the data of the database maintained in the primary system;

maintaining: a second backup data set provided additionally beyond the database maintained in the primary system, which is a previous copy of the first backup data set; and a third backup data set which is a copy of the second backup data set and which is provided additionally beyond the database maintained in the primary system;

copying differing data of the second backup data set, which are different from said first backup data set, into the third backup data set, prior to a switch of a referring target from the second backup data set over to the third backup data set;

switching a referring target from the second backup data set over to the third backup data set;

canceling individual data updates on the first backup data set, which have an uncommitted transaction status;

copying said first backup data set to said second backup data set after the canceling operation is completed, to sync the second backup data set to the first backup data set;

switching back the referring target from said third backup data set over to said second backup data set; and copying said second backup data set to said third backup data set, to sync the third backup data set to the second backup data set.

2. A computer storage device embodying a program carried out by a computer, the program for preparing, in a backup system, a referable backup data of data of a database which is maintained in a primary system, by using data update records of said database which are successively sent from said primary system, the program effecting operations of:

collectively rerunning, on a first backup data set provided additionally beyond the database maintained in the primary system, every data update indicated in each of update records, which are respectively followed by individual records indicating transaction commit for said data, where the update records were sent from said primary system to effect backup of the data of the database maintained in the primary system;

maintaining: a second backup data set provided additionally beyond the database maintained in the primary system, which is a previous copy of the first backup data set; and a third backup data set which is a copy of the second backup data set and which is provided additionally beyond the database maintained in the primary system;

copying differing data of the second backup data set, which are different from said first backup data set, into the third backup data set, prior to a switch of a referring target from the second backup data set over to the third backup data set;

switching a referring target from the second backup data set over to the third backup data set;

canceling individual data updates on the first backup data set, which have an uncommitted transaction status;

copying said first backup data set to said second backup data set after the canceling operation is completed, to sync the second backup data set to the first backup data set;

switching back the referring target from said third backup data set over to said second backup data set; and copying said second backup data set to said third backup data set, to sync the third backup data set to the second backup data set.

3. A method carried out in a computer, for preparing, in a backup system, a referable backup data of data of a database which is maintained in a primary system, by using data update records of said database which are successively sent from said primary system, wherein respective data in the database becomes effective only when a data update record of the respective data reaches a committed transaction status, the method comprising:

collectively rerunning, on a first backup data set provided additionally beyond the database maintained in the primary system, every data update indicated in each of update records, which are respectively followed by individual records indicating transaction commit for said data, where the update records were sent from said primary system to effect backup of the data of the database maintained in the primary system;

maintaining: a second backup data set provided additionally beyond the database maintained in the primary system, which is a previous copy of the first backup data set; and a third backup data set which is a copy of the second backup data set and which is provided additionally beyond the database maintained in the primary system;

copying differing data of the second backup data set, which are different from said first backup data set, into the third backup data set, prior to a switch of a referring target from the second backup data set over to the third backup data set;

switching a referring target from the second backup data set over to the third backup data set;

copying said first backup data set to said second backup data set after the canceling operation is completed, to sync the second backup data set to the first backup data set;

switching back the referring target from said third backup data set over to said second backup data set; and copying said second backup data set to said third backup data set, to sync the third backup data set to the second backup data set.

\* \* \* \* \*